(12) United States Patent
Ha et al.

(10) Patent No.: US 7,713,655 B2
(45) Date of Patent: May 11, 2010

(54) BATTERY MODULE AND MIDDLE OR LARGE-SIZED BATTERY PACK CONTAINING THE SAME

(75) Inventors: Jin Woong Ha, Daejeon (KR); Jeeho Kim, Daejeon (KR); Yongshik Shin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/310,871

(22) PCT Filed: Sep. 6, 2007

(86) PCT No.: PCT/KR2007/004294

§ 371 (c)(1),
(2), (4) Date: Oct. 21, 2009

(87) PCT Pub. No.: WO2008/035875

PCT Pub. Date: Mar. 27, 2008

(65) Prior Publication Data

US 2010/0035142 A1    Feb. 11, 2010

(30) Foreign Application Priority Data

Sep. 18, 2006    (KR) .................. 10-2006-0089897

(51) Int. Cl.
*H01M 2/10* (2006.01)
*H01M 6/46* (2006.01)
*H01M 2/04* (2006.01)

(52) U.S. Cl. .................. 429/99; 429/100; 429/153; 429/176

(58) Field of Classification Search .............. 429/96, 429/99, 100, 153, 162, 163, 176
See application file for complete search history.

(56) References Cited

U.S. PATENT DOCUMENTS

| 3,147,101 | A | * | 9/1964 | Phillips ............... 55/507 |
| 3,463,672 | A | * | 8/1969 | Schmidt .............. 429/123 |
| 4,347,294 | A | * | 8/1982 | Mejia ................ 429/151 |
| 5,639,571 | A | | 6/1997 | Waters et al. |
| 6,517,966 | B1 | * | 2/2003 | Marukawa et al. ... 429/120 |
| 2004/0021442 | A1 | | 2/2004 | Higashino |
| 2004/0058233 | A1 | | 3/2004 | Hamada et al. |

OTHER PUBLICATIONS

International Search Report, PCT/KR2007/004294.

* cited by examiner

*Primary Examiner*—Patrick Ryan
*Assistant Examiner*—Thomas H. Parsons
(74) *Attorney, Agent, or Firm*—Lerner, David, Littenberg, Krumholz & Mentlik, LLP (57) ABSTRACT

Disclosed herein is a battery module constructed in a structure in which a cell stack, including a plurality of secondary battery cells ('battery cells') or a plurality of unit modules, each of which including a plurality of battery cells, stacked with high density, is mounted in a hexahedral module case, wherein the module case is provided at least one side thereof with a sliding coupling structure, and the battery module has a variable grip mounted thereto.

17 Claims, 4 Drawing Sheets

BATTERY MODULE AND MIDDLE OR LARGE-SIZED BATTERY PACK CONTAINING THE SAME

CROSS REFERENCE TO RELATED APPLICATIONS

The present application is a national phase entry under 35 U.S.C. §371 of International Application No. PCT/KR2007/004294, filed Sep. 6, 2007, published in English, which claims the benefit of Korean Patent Application No. 10-2006-0089897, filed Sep. 18, 2006. The disclosures of said applications are incorporated by reference herein.

FIELD OF THE INVENTION

The present invention relates to a battery module having a specific structure and a battery pack including a plurality of such battery modules, and, more particularly, to a battery module constructed in a structure in which a cell stack, including a plurality of secondary battery cells ('battery cells') or a plurality of unit modules, each of which including a plurality of battery cells, stacked with high density, is mounted in a hexahedral module case, wherein the module case is provided at least one side thereof with a sliding coupling structure, and the battery module has a variable grip mounted thereto, and a battery pack including the same.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high output and large capacity are necessary for the middle- or large-sized devices.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

For the middle- or large-sized battery module to provide output and capacity required by a specific apparatus or device, it is necessary for the middle- or large-sized battery module to be constructed in a structure in which a plurality of battery cells are electrically connected in series or parallel with each other, and the battery cells are stable against an external force.

Consequently, when a middle- or large-sized battery module is constructed using a plurality of battery cells, a plurality of members for mechanical coupling and electrical connection between the battery cells are generally needed, and, as a result, a process for assembling the mechanical coupling and electrical connection members is very complicated. Furthermore, there is needed a space for coupling, welding, or soldering the mechanical coupling and electrical connection members, with the result that the total size of the system is increased. The increase in size of the system is not preferred in the aspect of the spatial limit of an apparatus or device in which the middle- or large-sized battery module is mounted. Furthermore, the middle- or large-sized battery module must be constructed in a more compact structure in order that the middle- or large-sized battery module is effectively mounted in a limited inner space, such as a vehicle.

In addition, when some of the battery modules, constituting the middle- or large-sized battery module, are abnormally operated, it takes a large amount of time and a large number of processes during the disassembly and assembly of the battery modules to replace the abnormally operated battery modules with new ones. Also, additional members may be mounted to improve the work efficiency; however, these members may act as a factor increasing the size of the battery module.

Consequently, there is a high necessity for a battery module assembly that is more compact, structurally stable, and easily disassembled and assembled, as previously described.

SUMMARY OF THE INVENTION

Therefore, the present invention has been made to solve the above problems, and other technical problems that have yet to be resolved.

Specifically, it is an object of the present invention to provide a battery module having a compact structure in which the battery module is stably mounted in a limited space, such as a vehicle, and that is easily assembled and disassembled, thereby improving the work efficiency, and a middle- or large-sized battery pack including the same.

In accordance with one aspect of the present invention, the above and other objects can be accomplished by the provision of a battery module constructed in a structure in which a cell stack, including a plurality of secondary battery cells ('battery cells') or a plurality of unit modules, each of which including a plurality of battery cells, stacked with high density, is mounted in a hexahedral module case, wherein the module case is provided at least one side thereof with a sliding coupling structure.

In the battery module according to the present invention, the sliding coupling structure is provided at the top and bottom and/or the right and left sides of the module case. Consequently, the coupling between the battery modules is accomplished through the sliding coupling structure without using additional connection members. Also, a middle- or large-sized battery pack including a plurality of such battery modules is constructed generally in a compact and stable coupling structure.

The battery module is constructed in a structure in which the battery cells or the unit modules are connected in series or parallel with each other. For example, the battery module may be manufactured by stacking two or more plate-shaped battery cells. Preferably, the battery module is manufactured by stacking two or more unit modules.

Each unit module may be constructed in various structures, preferred examples of which will be described below.

The unit module is constructed in a structure in which plate-shaped battery cells, each of which has electrode terminals formed at the upper and lower ends thereof, are connected in series with each other. Specifically, the unit module includes two or more battery cells, constructed in a structure in which the connections between the battery cells are bent such that the battery cells are stacked, and a high-strength cell cover coupled to the battery cells such that the cell cover surrounds the outer surfaces of the battery cells.

The plate-shaped battery cells are secondary batteries having a small thickness and a relatively large width and length sufficient to minimize the total size of the plate-shaped battery cells when the plate-shaped battery cells are stacked to construct the battery module. In a preferred embodiment, each battery cell is a secondary battery constructed in a structure in which an electrode assembly is mounted in a battery case made of a laminate sheet including a resin layer and a metal layer, and electrode terminals protrude from the upper and lower end of the battery case. Specifically, the battery cell may be constructed in a structure in which an electrode assembly is mounted in a pouch-shaped battery case made of an aluminum laminate sheet. The secondary battery with the above-described construction may be referred to as a pouch-shaped battery cell.

The battery cells in each unit module or between the respective unit modules are connected in series and/or parallel with each other. The coupling between the electrode terminals is accomplished in various manners, such as welding, soldering, and mechanical coupling. Preferably, the coupling between the electrode terminals is accomplished by welding.

The battery cells or unit modules, constructed in a structure in which the electrode terminals are connected to each other and the battery cells or unit modules are stacked with high integration, are vertically mounted in the module case, which includes upper and lower separate cases coupled to each other by an assembly coupling structure, to construct the battery module.

The material for the module case is not particularly restricted. Preferably, however, the module case is made of a metal material such that the module case exhibits a specific mechanical strength sufficient to protect the battery cells, mounted in the module case, from external impacts and a high manufacturing processability for easy formation of a coupling structure.

According to the present invention, the sliding coupling structure is formed at the module case. Specifically, the sliding coupling structure includes sliding grooves formed at the top of the module case in the longitudinal direction of the module case and corresponding sliding protrusions formed at the bottom of the module case in the longitudinal direction of the module case. Consequently, when two or more battery modules are stacked in the height direction, the sliding protrusions formed at the bottom of the module case of the upper battery module are engaged in the corresponding sliding grooves formed at the top of the module case of the lower battery module, with the result that the mechanical coupling between the battery modules is accomplished without using additional connection members. Preferably, the sliding grooves are formed at the right and left sides of the top of the module case, and the sliding protrusions are formed at the right and left sides of the bottom of the module case to maximize the coupling force between the battery modules.

Also, the module case is provided at the top and bottom thereof with a plurality of through-holes defining a coolant flow channel. A coolant (air) flow through the through-holes to remove heat generated from the battery cells during the charge and discharge of the battery cells.

The battery module according to the present invention may be constructed in a rectangular parallelepiped structure having a large height to width ratio in vertical section. Consequently, the battery module has a very compact and stable structure, and therefore, when a battery module assembly is mounted in a predetermined region, such as an inner space of a vehicle, the size-related problem is solved. Also, the plate-shaped battery cells or unit modules are stacked in the battery module while the plate-shaped battery cells or unit modules are erected vertically to the stacked surface between the battery modules, whereby the inner space utilizability is improved. In addition, the flowing through direction of the through-holes coincides with the stacking direction of the battery cells, and therefore, the flow of the coolant is smoother, whereby the cooling efficiency is improved.

In a preferred embodiment, a variable grip is mounted to one side of the battery module. For example, the variable grip may be constructed in a structure in which one end of the variable grip is hingedly mounted to the front of the module case such that the variable grip is separated from the front of the module case by the pivot rotation of the variable grip, if necessary. Since the grip is hingedly mounted to the battery module, the increase in volume of the battery module due to the attachment of the grip is minimized.

Specifically, when the grip is used, the grip is separated from the front of the module case by the pivot rotation of the grip, whereby the use of the grip is not limited. On the other hand, when the grip is not used, the grip is brought into tight contact with the front of the module case by the pivot rotation of the grip in the direction opposite to the above-mentioned direction.

Preferably, the variable grip is provided, at the other end opposite to the end of the variable grip where the variable grip is hingedly connected to the module case, with a small-sized coupling groove, and the module case is provided at the front thereof with a coupling protrusion corresponding to the coupling groove of the variable grip. In this case, when the variable grip is brought into tight contact with the front of the module case, the coupling protrusion of the module case is engaged into the coupling groove of the variable grip, whereby the movement of the grip is prevented. Alternatively, the coupling groove may be formed at the front of the module case, and the coupling protrusion may be formed at the end of the variable grip. According to circumstances, the variable grip may be provided, at the other end opposite to the end of the variable grip where the variable grip is hingedly connected to the module case, with a small-sized coupling hole, and the module case may be provided at the front thereof with a coupling groove corresponding to the coupling hole of the variable grip. In this case, the coupling between the variable grip and the module case is accomplished by inserting a coupling member, such as a bolt, into the coupling groove of the module case through the coupling hole of the variable grip while the variable grip is in tight contact with the front of the module case.

More preferably, the variable grip is constructed in a plate-shaped structure in which the variable grip is depressed at one side thereof. With the adoption of the plate-shaped structure, it is possible to minimize the increase in volume of the battery module due to the attachment of the grip. In addition, the formation of the grip, such that the grip is depressed at one side thereof, improves the work efficiency during the assembly or disassembly of the battery module.

In accordance with another aspect of the present invention, there is provided a middle- or large-sized battery pack having a high output and large capacity, which includes a plurality of such battery modules. Preferably, the middle- or large-sized battery pack is constructed in a structure in which the battery modules are mounted in a pack case, which is open at the front and rear thereof, while the battery modules are stacked in the height direction and in the lateral direction.

The middle- or large-sized battery pack according to the present invention may be used as a power source for electric vehicles, hybrid electric vehicles, uninterruptible power supplies (UPS), idle reduction devices, and energy storage devices, which have a limited installation space and are exposed to frequent vibration and strong impact, in consideration of the installation efficiency and structural stability of the battery pack. Especially, the middle- or large-sized battery pack according to the present invention is preferably used as a charging and discharging power source for electric vehicles.

BRIEF DESCRIPTION OF THE DRAWINGS

The above and other objects, features and other advantages of the present invention will be more clearly understood from the following detailed description taken in conjunction with the accompanying drawings, in which.

<Description of Main Reference Numerals of the Drawings>

| | |
|---|---|
| 100: battery module | 200: module case |
| 300: variable grip | 400: module connector |
| 500: battery module stack | 600: middle- or large-sized battery pack |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
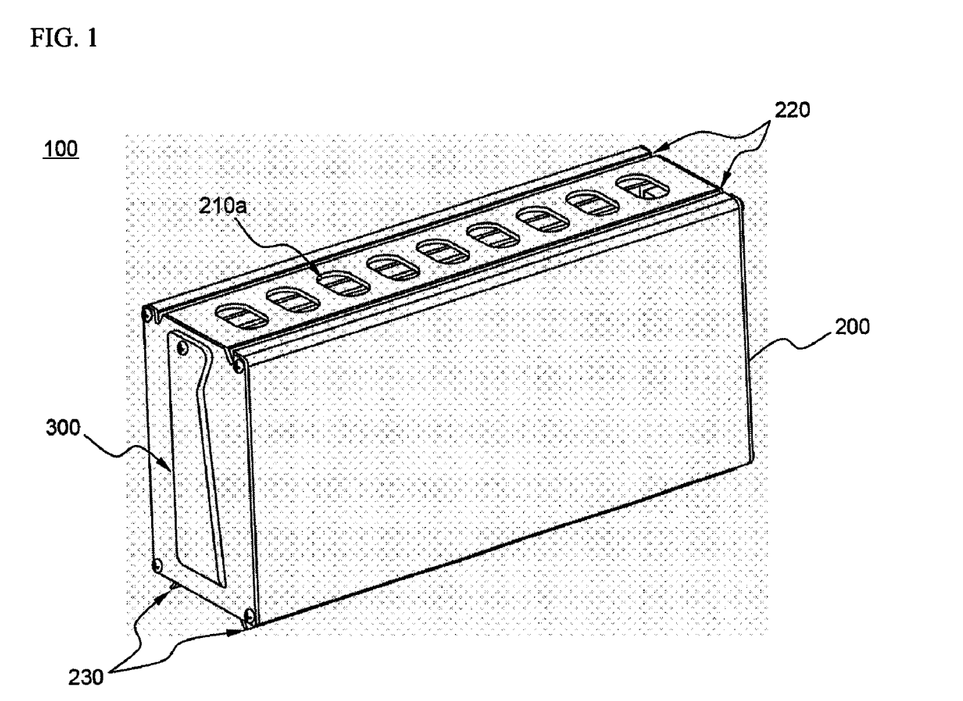
FIGS. 1 and 2 are perspective views illustrating the front and rear of a battery module according to a preferred embodiment of the present invention, respectively.
Figure 2:
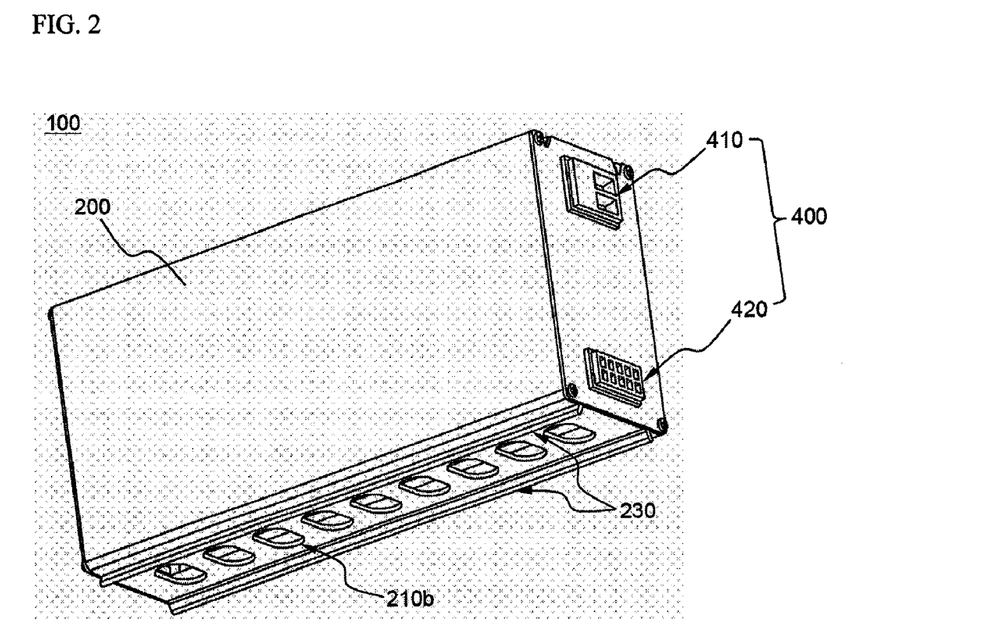

FIGS. 1 and 2 are perspective views typically illustrating the front and rear of a battery module according to a preferred embodiment of the present invention, respectively.

Referring first to FIG. 1, a module case 200 is mounted to the outside of the battery module 100. At the middle of the top of the module case 200 are formed a plurality of through-holes 210a for cooling battery cells of the battery module 100. At the right and left sides of the through-holes 210a are formed sliding grooves 220, which extend in the longitudinal direction of the module case 200. At the bottom of the module case 200 are formed sliding protrusions 230 corresponding to the sliding grooves 220. Consequently, when battery modules 100 are stacked in the height direction, the sliding protrusions 230 formed at the bottom of the upper battery module are engaged in the corresponding sliding grooves 220 formed at the top of the lower battery module, and therefore, the mechanical coupling between the battery modules is accomplished without using additional connecting members.

According to circumstances, the sliding grooves 220 may be formed at the bottom of the module case 200, and the sliding protrusions 230 may be formed at the top of the module case 200.

To the front of the module case 200 is hingedly mounted a variable grip 300. As shown in the drawing, the variable grip 300 is folded such that the variable grip 300 is in tight contact with the front of the module case 200. The variable grip 300 is constructed in a plate-shaped structure in which the variable grip 300 is depressed at one side thereof. Consequently, the work efficiency is improved during the assembly or disassembly of the battery module 100, and, at the same time, the increase in volume of the battery module 100 due to the attachment of the grip 300 is minimized. The variable grip 300 will be described below in more detail with reference to FIG. 4.

Referring now to FIG. 2, a plurality of through-holes 210b are formed at the middle of the bottom of the module case 200 such that a coolant (air), introduced into the module case 200 through the upper through-holes 210a, is easily discharged out of the module case 200 through the through-holes 210b. The sliding protrusions 230 are formed at the right and left sides of the through-holes 210b such that the sliding protrusions 230 extend in the longitudinal direction of the module case 200. At the rear of the battery module 100 are located a power connector 420 and a communication connector 410, through which the battery module 100 is electrically connected to an external circuit.

Figure 3:
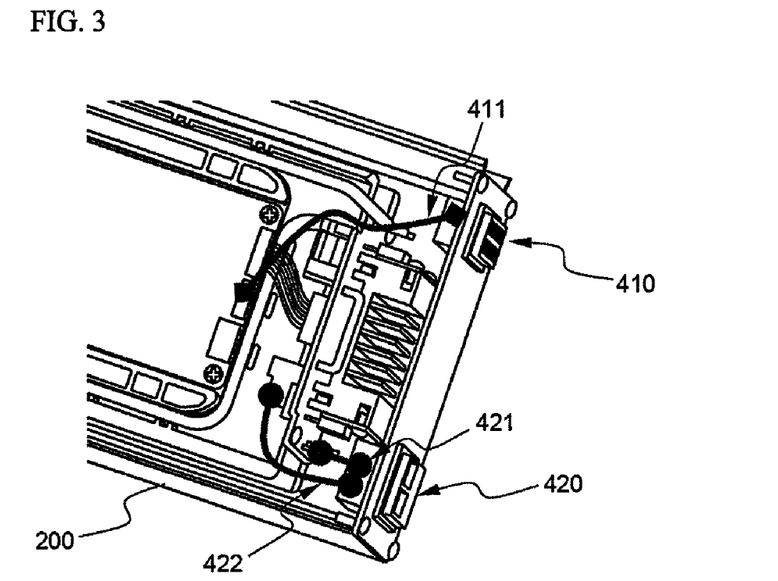
FIG. 3 is a typical view illustrating the electrical connection structure between rear connectors and battery cells in the battery module.

FIG. 3 is a typical view illustrating the electrical connection structure between the rear connectors and the battery cells in the battery module.

An anode power cable 422, connected to anode plates of the battery cells, is connected to an anode connector of the power connector 420 located at the rear of the module case 200, and a cathode power cable 321 is connected to a cathode connector of the power connector 420, via a switching element, such as a field effect transistor (FET) element, for controlling the overcharge, overdischarge, and overcurrent of the battery cells.

Also, a communication port, for detection of voltage and communication with another battery module, is connected between a main board assembly of the battery module and the communication connector 410 located at the rear of the battery module.

Figure 4:
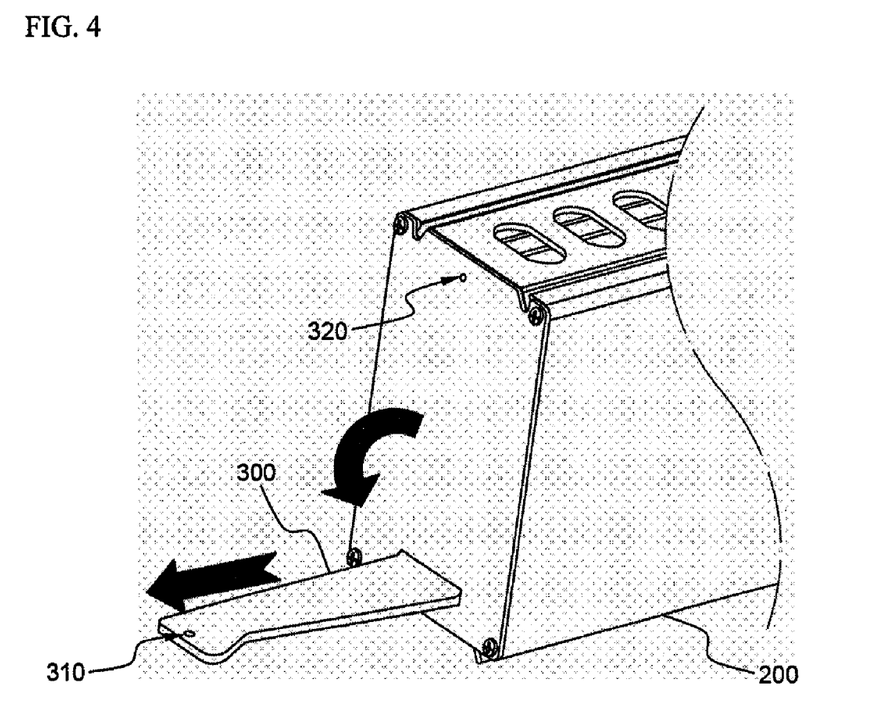
FIG. 4 is a partially enlarged view illustrating a variable grip according to a preferred embodiment of the present invention.

FIG. 4 is a partially enlarged view illustrating a variable grip according to a preferred embodiment of the present invention. The variable grip 300 is mounted to the front of the module case 200 such that one end of the variable grip 300 is hingedly connected to the module case 200. At the other end of the variable grip 300, opposite to the end of the variable grip 300 where the variable grip 300 is hingedly connected to the module case 200, is formed a small-sized coupling groove 310. At the front of the module case 200 is formed a coupling protrusion 320 corresponding to the coupling groove 310. The coupling and separation between the coupling groove 310 and the coupling protrusion 320 are possible. Consequently, when the variable grip 300 is used, as shown in FIG. 4, the variable grip 300 is separated from the module case 200 by the pivot rotation of the variable grip 300. On the other hand, when the variable grip 300 is not used, as shown in FIG. 5, the variable grip 300 is brought into tight contact with the front of the module case 200 by the pivot rotation of the variable grip 300 in the direction opposite to the direction shown in FIG. 4.

Figure 5:
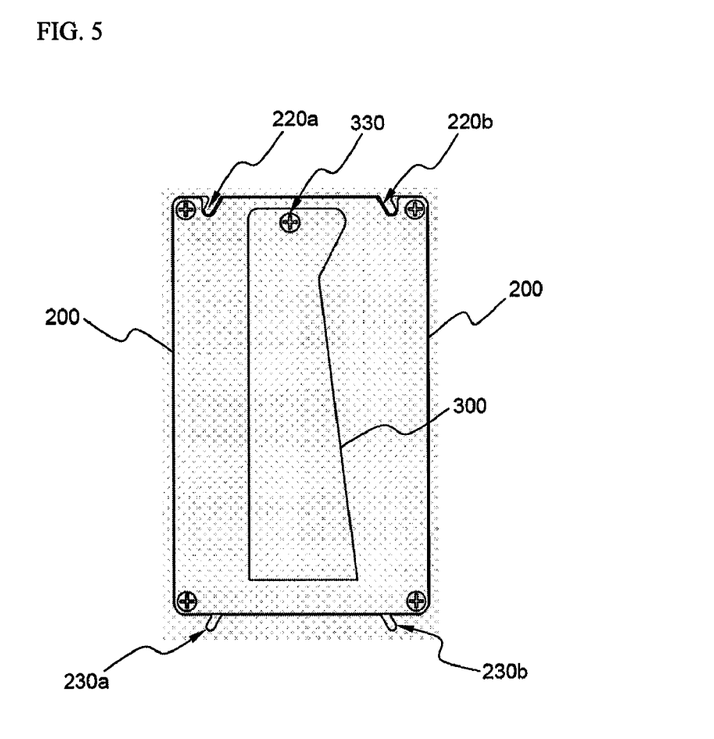
FIG. 5 is a front view illustrating the battery module of FIG. 1.

FIG. 5 is a front view of the battery module. The sliding grooves 220a and 220b are formed at the top of the module case 200 such that the sliding grooves 220a and 220b extend in the longitudinal direction of the module case 200, and the sliding protrusions 230a and 230b are formed at the bottom of the module case 200 such that the sliding protrusions 230a and 230b extend in the longitudinal direction of the module case 200. The sliding protrusions 230a and 230b correspond to the sliding grooves 220a and 220b, respectively, such that the coupling between the battery modules 100 is accomplished by the engagement of the sliding protrusions 230a and 230b in the corresponding sliding grooves 220a and 220b. The variable grip 300 is mounted to the front of the module case 200 while the variable grip 300 is in tight contact with the module case 200. In this embodiment, a coupling hole (not shown) is formed through the variable grip 300, and a coupling groove (not shown), corresponding to the coupling hole, is formed at the front of the module case 200. In this case, a bolt 330 is inserted into the coupling groove of the module case 100 through the coupling hole of the variable grip 300 such that the tight contact between the variable grip 300 and the module case 200 is achieved.

Figure 6:
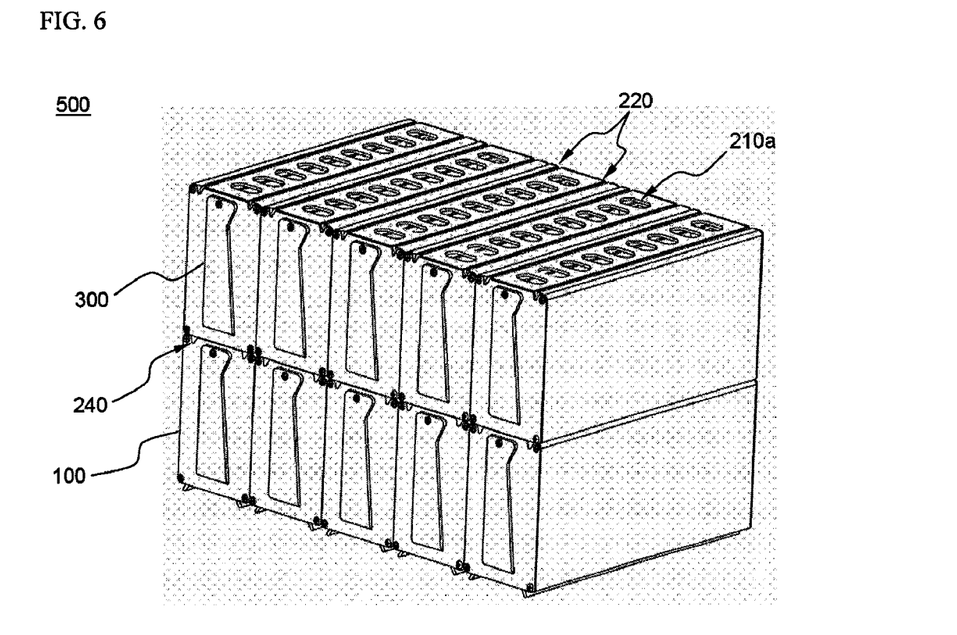
FIG. 6 is a perspective view illustrating a battery module stack constructed by stacking a plurality of battery modules, one of which is shown in FIG. 1.

FIG. 6 is a perspective view illustrating a battery module stack constructed by stacking a plurality of battery modules.

Referring to FIG. 6, two battery modules 100 are stacked in the height direction, and five battery modules 100 are coupled to each other in the lateral direction. The through-holes 210a and 210b (see FIG. 2) are formed at the top and bottom of each battery module case 200, respectively, such that a coolant flows in the vertical direction, thereby greatly improving the cooling efficiency of the battery cells. Also, the sliding grooves 220 and the sliding protrusions (not shown) are formed at the top and bottom of each battery module case 200, respectively, such that the sliding grooves and the sliding protrusions extend in the longitudinal direction of the module case 200, whereby the battery modules 100 are coupled to each other in a sliding fashion. Consequently, when the battery modules 100 are stacked in the height direction, the battery modules 100 are coupled to each other (see reference numeral 240) by the sliding coupling structure. Also, the variable grip 300 is hingedly mounted to the front of the module case 200.

Figure 7:
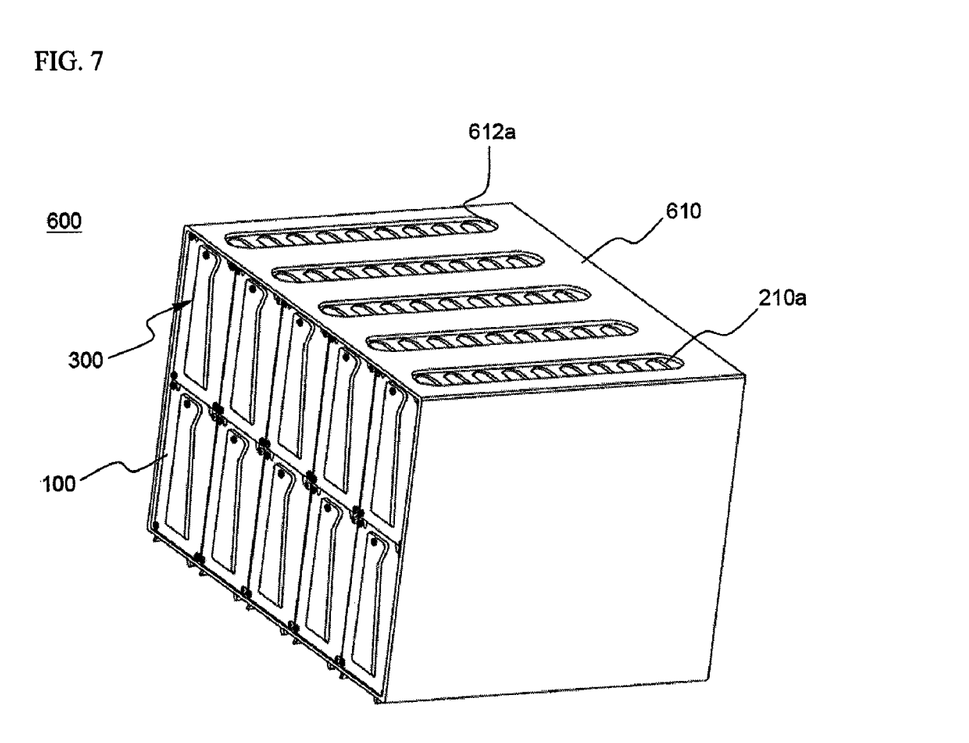
FIGS. 7 and 8 are perspective views illustrating the front and rear of a middle- or large-sized battery pack including a battery pack case surrounding the battery module stack shown in FIG. 6.
Figure 8:
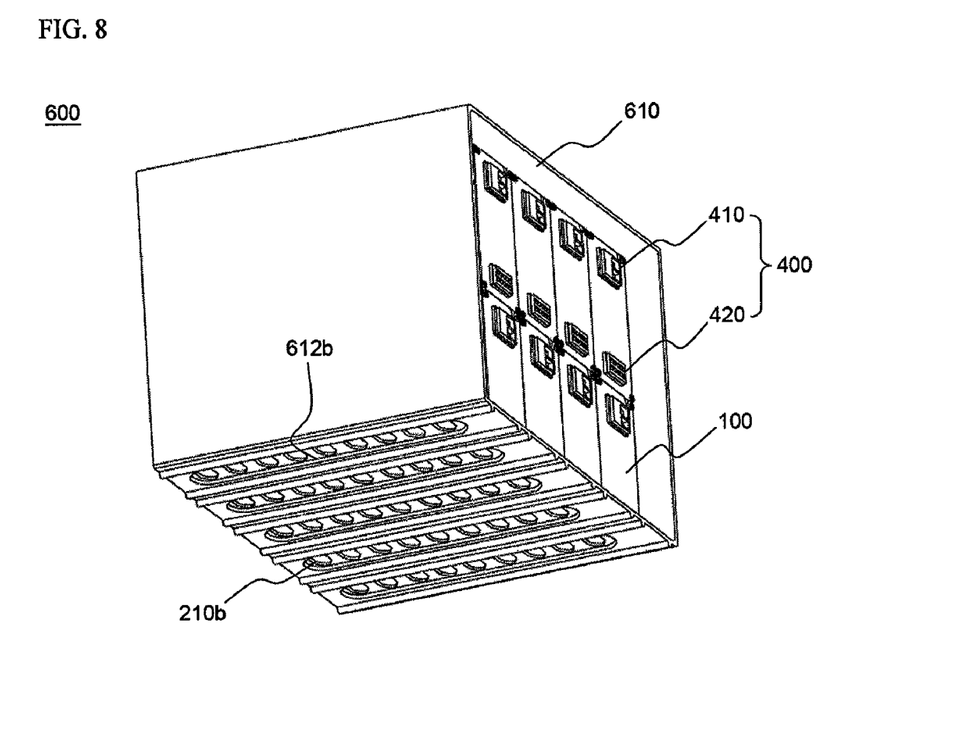

FIGS. 7 and 8 are perspective views illustrating the front and rear of a middle- or large-sized battery pack constructed in a structure in which the battery module stack shown in FIG. 6 is surrounded by a battery pack case.

Referring to these drawings, the battery pack case 610 is mounted to the battery module stack 500 (see FIG. 6), such that the battery module stack 500 is surrounded by the battery pack case 610, whereby the mechanical coupling and electrical connection between the respective battery modules are accomplished. The respective battery modules 100 are coupled to each other in the height direction by the sliding coupling structure. All the battery modules 100 are mounted in the battery pack case 610 to construct a middle- or large-sized battery pack. The battery pack case 610 is open at the front and rear thereof. The battery pack case 610 is provided at the top and bottom thereof with through-holes 612a and 612b, respectively, through which a coolant flows. The through-holes 612a and 612b extend in the longitudinal direction of the battery modules 100 such that the through-holes 210a and 210b of the battery modules 100 are exposed to the outside through the through-holes 612a and 612b of the battery pack case 610.

Also, a module connector 400, including the power connector 420 and the communication connector 410, of each battery module 100 is exposed at the rear of the middle- or large-sized battery pack 600 such that the connection between the battery modules 100 and an external circuit is easily performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module according to the present invention is constructed in a compact structure in which the battery module is stably mounted in a limited space, such as a vehicle, by the sliding coupling structure. Also, the number of the mechanical coupling and electrical connection members is small, and the battery module is assembled by a simple method. Furthermore, the assembly and disassembly of the battery module are easily performed by the variable grip, whereby the work efficiency is improved.

What is claimed is:

1. A battery module constructed in a structure in which a cell stack, including a plurality of secondary battery cells ('battery cells'), which can be charged and discharged, or a plurality of unit modules, each of which including a plurality of battery cells, stacked, is mounted in a hexahedral module case, wherein
   the module case is provided at (i) the top and bottom or (ii) the right and left sides, or (iii) the top, the bottom, the right and left sides thereof with a sliding coupling structure.

2. The battery module according to claim 1, wherein each battery cell is a plate-shaped battery cell having an electrode assembly mounted in a laminate sheet including a resin layer and a metal layer.

3. The battery module according to claim 1, wherein the module case is made of a metal material.

4. The battery module according to claim 1, wherein the sliding coupling structure includes sliding grooves formed at the top of the module case in the longitudinal direction of the module case and corresponding sliding protrusions formed at the bottom of the module case in the longitudinal direction of the module case.

5. The battery module according to claim 4, wherein the sliding grooves are formed at the right and left sides of the top of the module case, and the sliding protrusions are formed at the right and left sides of the bottom of the module case.

6. The battery module according to claim 1, wherein the module case is provided at the top and bottom thereof with a plurality of through-holes defining a coolant flow channel.

7. The battery module according to claim 1, wherein the battery module is constructed in a rectangular parallelepiped structure having a large height to width ratio in vertical section, and the plate-shaped battery cells or unit modules are stacked in the battery module while the plate-shaped battery cells or unit modules are erected.

8. The battery module according to claim 1, wherein a variable grip is mounted to one side of the battery module.

9. The battery module according to claim 8, wherein the variable grip is constructed in a structure in which one end of the variable grip is hingedly mounted to the front of the module case such that the variable grip is separated from the front of the module case by the pivot rotation of the variable grip, if necessary.

10. The battery module according to claim 9, wherein
   the variable grip is provided, at the other end opposite to the end of the variable grip where the variable grip is hingedly connected to the module case, with a small-sized coupling groove or coupling protrusion, and the module case is provided at the front thereof with a coupling protrusion or coupling groove corresponding to the coupling groove or coupling protrusion of the variable grip.

11. The battery module according to claim 9, wherein the variable grip is provided, at the other end opposite to the end of the variable grip where the variable grip is hingedly connected to the module case, with a small-sized coupling hole, and the module case is provided at the front thereof with a coupling groove corresponding to the coupling hole of the variable grip, whereby the coupling between the variable grip and the module case is accomplished by inserting a coupling member into the coupling groove of the module case through the coupling hole of the variable grip while the variable grip is in tight contact with the front of the module case.

12. The battery module according to claim 9, wherein the variable grip is constructed in a plate-shaped structure in which the variable grip is depressed at one side thereof.

13. The battery module according to claim 1, wherein the battery module is provided at the rear thereof with an external input and output connector and a communication connector.

14. The battery pack according to claim 13, wherein the battery pack is used as a charging and discharging power source for electric vehicles or hybrid electric vehicles.

15. The battery pack according to claim 14, wherein the battery pack is used as a charging and discharging power source for electric vehicles.

16. A middle- or large-sized battery pack having a high output and large capacity, which includes a plurality of battery modules according to claim 1.

17. The battery pack according to claim 16, wherein the battery pack is constructed in a structure in which the battery modules are mounted in a pack case, which is open at the front and rear thereof, while the battery modules are stacked in the height direction and in the lateral direction.

* * * * *

UNITED STATES PATENT AND TRADEMARK OFFICE
CERTIFICATE OF CORRECTION

| | | |
|---|---|---|
| PATENT NO. | : 7,713,655 B2 | Page 1 of 1 |
| APPLICATION NO. | : 12/310871 | |
| DATED | : May 11, 2010 | |
| INVENTOR(S) | : Jin Woong Ha, Jeeho Kim and Yongshik Shin | |

It is certified that error appears in the above-identified patent and that said Letters Patent is hereby corrected as shown below:

On Title page of Patent under Abstract (57), line 6, between "at" and "least" insert --at--.
Column 1, line 25, between "at" and "least" insert --at--.
Column 1, line 49, "weight to capacity" should read --weight-to-capacity--.
Column 2, line 42, between "at" and "least" insert --at--.
Column 3, line 12, "end" should read --ends--.
Column 3, line 58, "flow" should read --flows--.
Column 3, line 63, "height to width" should read --height-to-width--.
Column 7, line 18, delete the first word "the" between "that" and "tight".
Column 8, line 53, "height to width" should read --height-to-width--.
Column 10, delete claim paragraphs 14 through 17 as they should read:
--14. A middle- or large-sized battery pack having a high output and large capacity, which includes a plurality of battery modules according to claim 1.
15. The battery pack according to claim 14, wherein the battery pack is constructed in a structure in which the battery modules are mounted in a pack case, which is open at the front and rear thereof, while the battery modules are stacked in the height direction and in the lateral direction.
16. The battery pack according to claim 14, wherein the battery pack is used as a charging and discharging power source for electric vehicles or hybrid electric vehicles.
17. The battery pack according to claim 16, wherein the battery pack is used as a charging and discharging power source for electric vehicles.--.

Signed and Sealed this
Fourteenth Day of February, 2012

David J. Kappos
*Director of the United States Patent and Trademark Office*